(12) United States Patent
Ford

(10) Patent No.: US 11,441,672 B2
(45) Date of Patent: Sep. 13, 2022

(54) ADJUSTABLE SHIFT LEVER MOUNT

(71) Applicant: Lokar, Inc., Knoxville, TN (US)

(72) Inventor: Kevin Ford, Knoxville, TN (US)

( * ) Notice: Subject to any disclaimer, the term of this patent is extended or adjusted under 35 U.S.C. 154(b) by 0 days.

(21) Appl. No.: 17/074,210

(22) Filed: Oct. 19, 2020

(65) Prior Publication Data

US 2021/0123523 A1 Apr. 29, 2021

Related U.S. Application Data

(60) Provisional application No. 62/927,466, filed on Oct. 29, 2019.

(51) Int. Cl.
*F16H 59/02* (2006.01)
*B60K 20/02* (2006.01)
*F16H 59/04* (2006.01)

(52) U.S. Cl.
CPC ......... *F16H 59/0278* (2013.01); *B60K 20/02* (2013.01); *F16H 59/04* (2013.01); *F16H 2059/0269* (2013.01)

(58) Field of Classification Search
CPC .. F16C 11/06; G05G 1/04; G05G 1/12; F16H 2059/0269; F16H 59/04; F16H 59/0278; B60K 20/02
USPC ............................ 74/519, 522, 523, 524, 525
See application file for complete search history.

(56) References Cited

U.S. PATENT DOCUMENTS

| | | | | |
|---|---|---|---|---|
| 3,800,924 A * | 4/1974 | Hansen | ................... | F16H 59/02 192/218 |
| 5,907,975 A * | 6/1999 | Giaimo | ................... | F16H 59/04 74/473.34 |
| 9,506,556 B1 * | 11/2016 | Fredrick | ................. | F16H 61/24 |
| 10,704,673 B1 * | 7/2020 | Brown | ..................... | F16H 59/04 |
| 2005/0130146 A1 * | 6/2005 | Zelent | ..................... | A61P 35/00 435/6.12 |
| 2007/0137367 A1 * | 6/2007 | Papa | ....................... | F16H 59/04 74/473.34 |
| 2008/0173120 A1 * | 7/2008 | Ciamillo | ............. | F16H 59/0278 74/473.3 |
| 2008/0314186 A1 * | 12/2008 | Ford | ................... | F16H 59/0278 74/473.23 |
| 2015/0198238 A1 * | 7/2015 | Smith | ..................... | F16H 59/04 74/473.1 |
| 2017/0363201 A1 * | 12/2017 | Min | ......................... | F16H 59/04 |
| 2018/0188766 A1 * | 7/2018 | Fryer | .................. | F16H 59/0278 |

* cited by examiner

*Primary Examiner* — Jake Cook
*Assistant Examiner* — Gregory Robert Weber
(74) *Attorney, Agent, or Firm* — Blanchard Horton PLLC

(57) ABSTRACT

A shift lever mount assembly including a rotatable member having a ball portion formed with at least a partially arcuate surface and a shift lever connection portion extending from the ball portion to be connected to a shift lever, a casing formed to at least partially surround the ball portion of the rotatable member and having an inner surface forming a spherical bearing with the ball portion, the casing having a top opening through which the shift lever connection portion extends, a plurality of position fixing members to selectively contact the rotatable member so as to fix the rotatable member at a desired position, and a coupling member to selectively couple the casing to a control lever of a transmission shift assembly, wherein the spherical bearing allows rotational and angular movement of the rotatable member so that the rotatable member is selectively movable to the desired position.

18 Claims, 6 Drawing Sheets

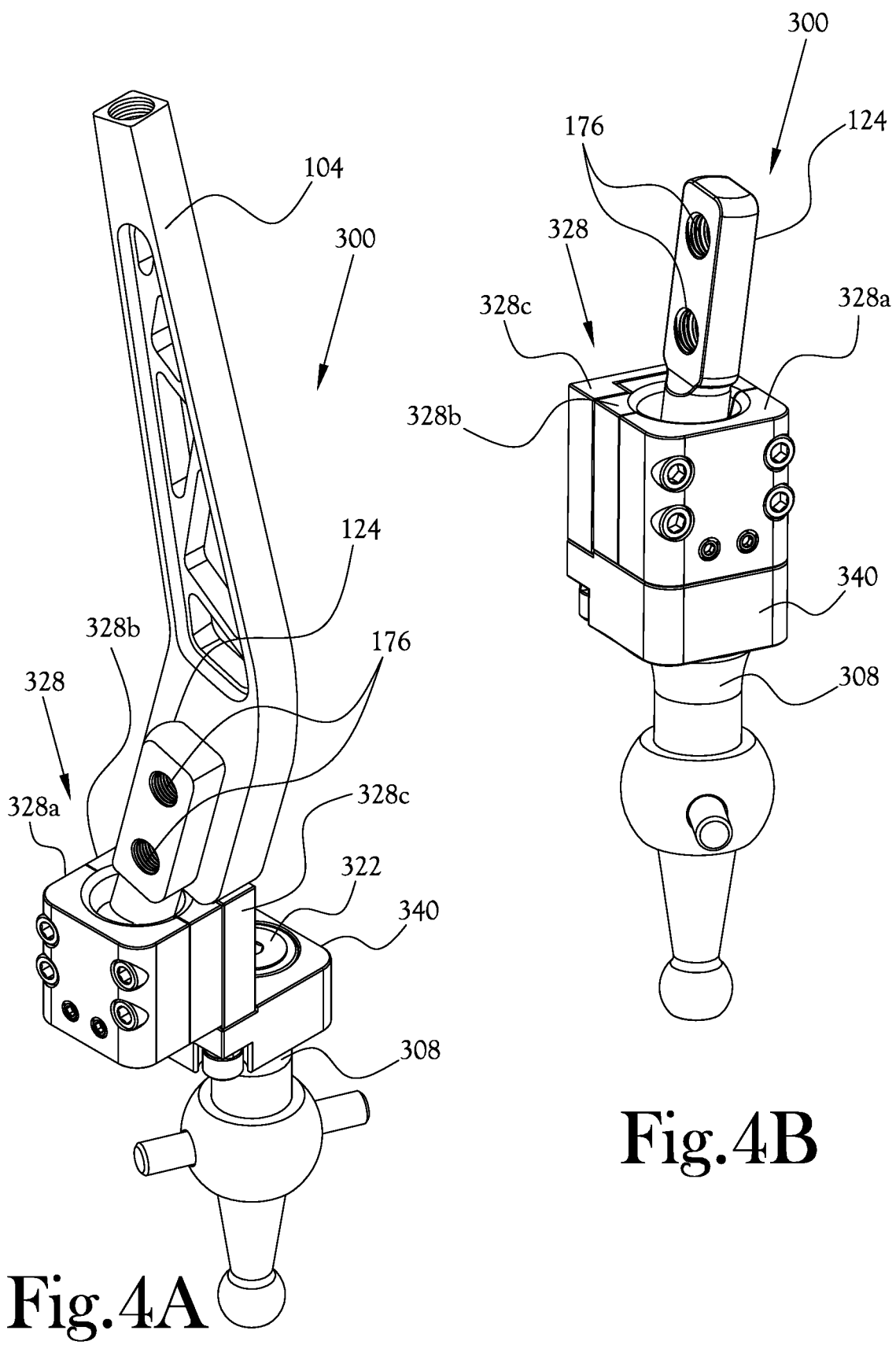

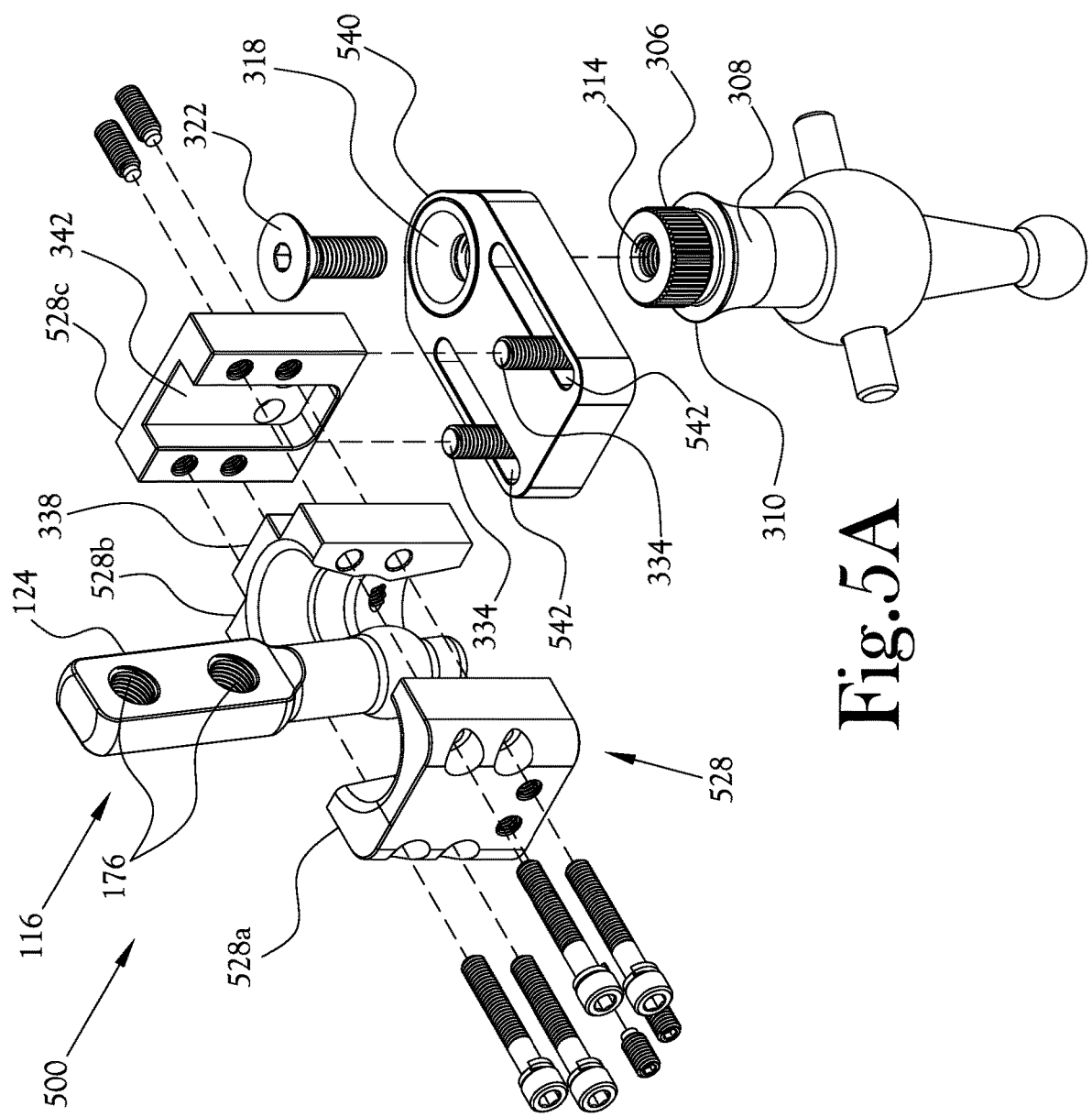

ADJUSTABLE SHIFT LEVER MOUNT

CROSS-REFERENCE TO RELATED APPLICATIONS

This application claims the benefit of U.S. Provisional Patent Application Ser. No. 62/927,466, filed on Oct. 29, 2019, which is incorporated herein in its entirety by reference.

FIELD OF INVENTION

The present general inventive concept relates to a shift lever mount, and, more particularly, to a shift lever mount that is adjustable in a plurality of directions.

BACKGROUND

Automobiles with manually operated transmissions are provided with gear shift levers, or shifter levers, that are operated by the driver to change gears in the transmission. The vast majority of the shift levers are provided on the floor or console in modern cars, and various different sizes and configurations of gear shift levers are used. However, regardless of the configuration, conventional gear shift levers are typically restricted to one arrangement, e.g., length, position, etc., which can be problematic to drivers of different sizes and/or preferences. There have been some developments with differently shaped shift levers that can be changed out as preferred, but the placement and general overall orientation of those shift levers is still very limited. Therefore, it would be desirable to allow customization of various placement aspects, which would allow adjustments in various spatial dimensions, of an installed gear shift lever to better suit the preferences of a particular user.

BRIEF SUMMARY

According to various example embodiments of the present general inventive concept, a shift lever mount is provided that allows a customizable position of a shift lever coupled to a control lever of a transmission shift assembly. The shift lever mount includes a spherical bearing that allows rotational and singular movement of the shift lever attached to the shift lever mount, to enhance the positional possibilities of the shift lever.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by providing a shift lever mount assembly including a rotatable member including a ball portion formed with at least a partially arcuate surface and a shift lever connection portion extending from the ball portion and configured to be selectively connected to a shift lever, a casing formed to at least partially surround the ball portion of the rotatable member and configured with an inner surface so as to form a spherical bearing with the ball portion, the casing having a top opening configured such that the shift lever connection portion extends therethrough, a plurality of position fixing members provided to the casing and configured to selectively contact the rotatable member so as to fix the rotatable member at a desired position, and a coupling member configured to selectively couple the casing to a control lever of a transmission shift assembly, wherein the spherical bearing is configured to allow rotational and angular movement of the rotatable member so that the rotatable member is selectively movable to the desired position.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIGS. 4A-B illustrate perspective views of the shift lever mount assembly of FIG. 3 installed in different orientations;

FIG. 5A illustrates an exploded view of a shift lever mount assembly according to yet another example embodiment of the present general inventive concept, and FIG. 5B illustrates another perspective view of the coupling member of FIG. 5A.

DETAILED DESCRIPTION

Figure 1:
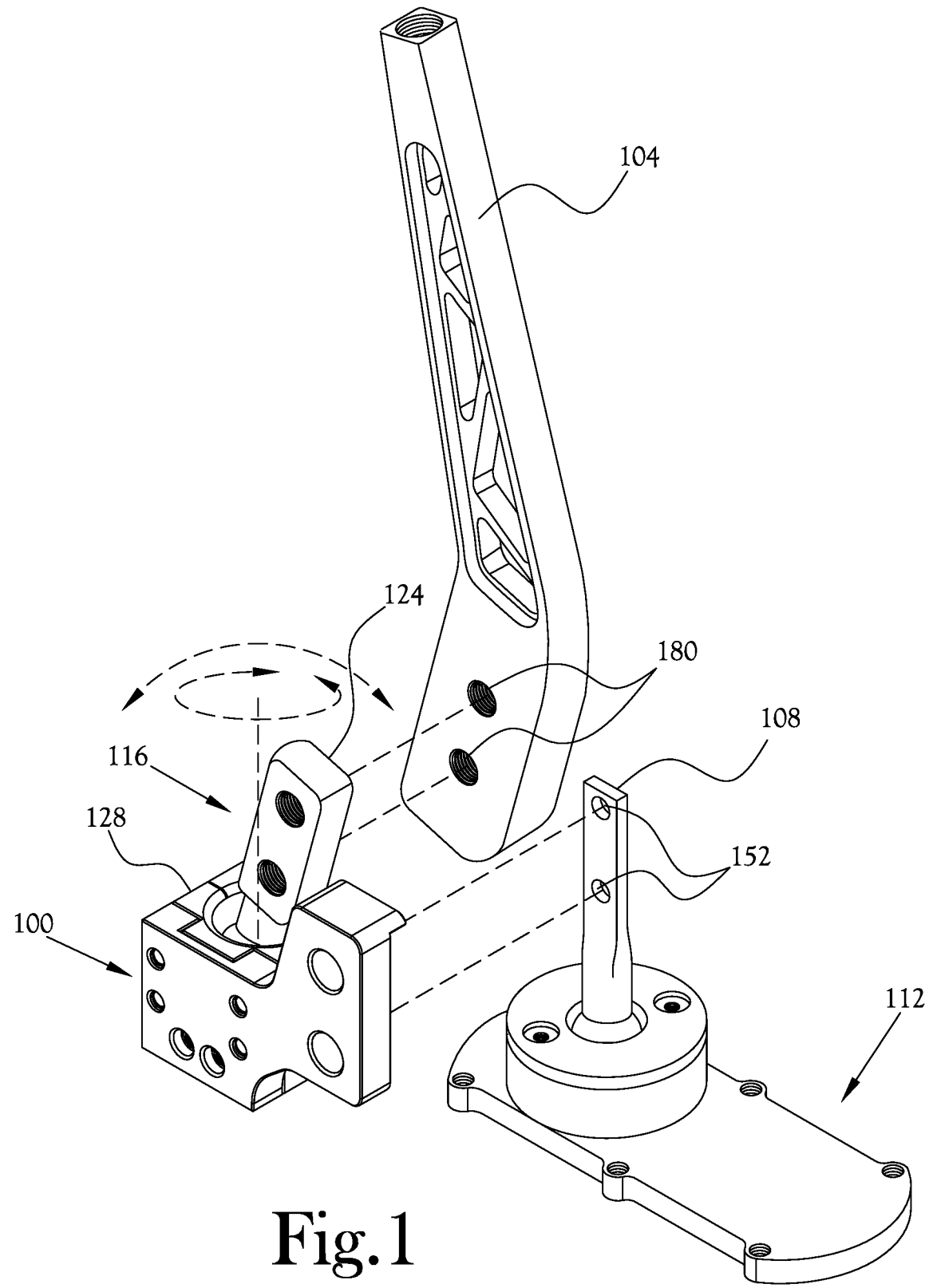
FIG. 1 illustrates a perspective view of a shift lever mount assembly according to an example embodiment of the present general inventive concept.

Reference will now be made to the example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the structures and fabrication techniques described herein. Accordingly, various changes, modification, and equivalents of the structures and fabrication techniques described herein will be suggested to those of ordinary skill in the art. The progression of fabrication operations described are merely examples, however, and the sequence type of operations is not limited to that set forth herein and may be changed as is known in the art, with the exception of operations necessarily occurring in a certain order. Also, description of well-known functions and constructions may be simplified and/or omitted for increased clarity and conciseness.

Note that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. Spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

According to various example embodiments of the present general inventive concept, a shift lever mount, which may be referred to herein as a shift lever mount assembly, is provided that allows a customizable position of a shift lever coupled to a control lever of a transmission shift assembly. The shift lever mount includes a spherical bearing that allows rotational and angular movement of the shift lever attached to the shift lever mount, to enhance the positional possibilities of the shift lever. The spherical bearing allows rotation in two planes at the same time, or angular rotation about a central point in two orthogonal directions. Such a shift lever mount may be used as a connecting member between a shift lever and a control lever. For example, various control levers, such as some produced by TREMEC®, are formed essentially as shift stubs with a lower portion that is much the same as a conventional shifting lever/rod, in that it moves into position to engage the gear selector forks of the transmission assembly. Movement of the shift stub causes selective engagement and disengagement of the plurality of gears provided within the transmission. An upper portion of the shift stub, or control lever, is formed as a bracket or some type of connection to which a shift lever may be mounted, such that a lower end of the shift lever is attached to the shift stub of the transmission so as to provide a mechanical connection therebetween. As a result, movement of the shift lever causes corresponding movement of the shift stub and, consequently, operation of the transmission as described above. This allows a user to customize the look of the gear shifter, due to the large amount of shift levers that are mountable to the control lever. However, by utilizing the shift lever mount assembly of the present general inventive concept, the shift lever mount may be attached to the control lever in much the same manner that a shift lever could be typically attached, and then the shift lever can be in turn attached to the shift lever mount in the same manner that it would otherwise be attached to the control lever. And, because of the spherical bearing provided in the shift lever mount, a user can adjust the shift lever in a variety of directions, including 360 degrees of rotation as well as angular rotation, to place the shift lever in a desired position for better functionality and/or aesthetics. In various example embodiments of the present general inventive concept the shift lever mount assembly may include its own control lever to be used in the general transmission shift assembly. Such a control lever may be referred to herein as a substitute control lever. According to various example embodiments of the present general inventive concept, the inclusion of the spherical bearing allows a user to customize positional aspects of the shift lever, such as location and angle, in a simple and convenient manner before or after the shift lever has been installed in the automobile.

FIG. 1 illustrates a perspective view of a shift lever mount assembly according to an example embodiment of the present general inventive concept. As illustrated in FIG. 1, the shift lever mount assembly 100 is configured to be attached directly to a control lever 108 of a general transmission shift assembly 112. The shift lever mount assembly 100 includes a casing 128 with a portion of a rotational member 116 held inside so as to form a spherical bearing that allows rotational and angular movement of the rotatable member 116 so as to be moved to a host of different positions. The rotatable member 116 includes a shift lever connecting portion 124 that extends outside of the casing, and which is configured to be connected to a lower portion of a shift lever 104. Thus, when connected to the shift lever connecting portion 124 of the rotatable member 116, the shift lever is able to be moved to a selected position and fixed there. As used herein, the terms connecting and coupling may refer to a direct connection between two members, or a connection between members that have other members connected therebetween.

Figure 2:
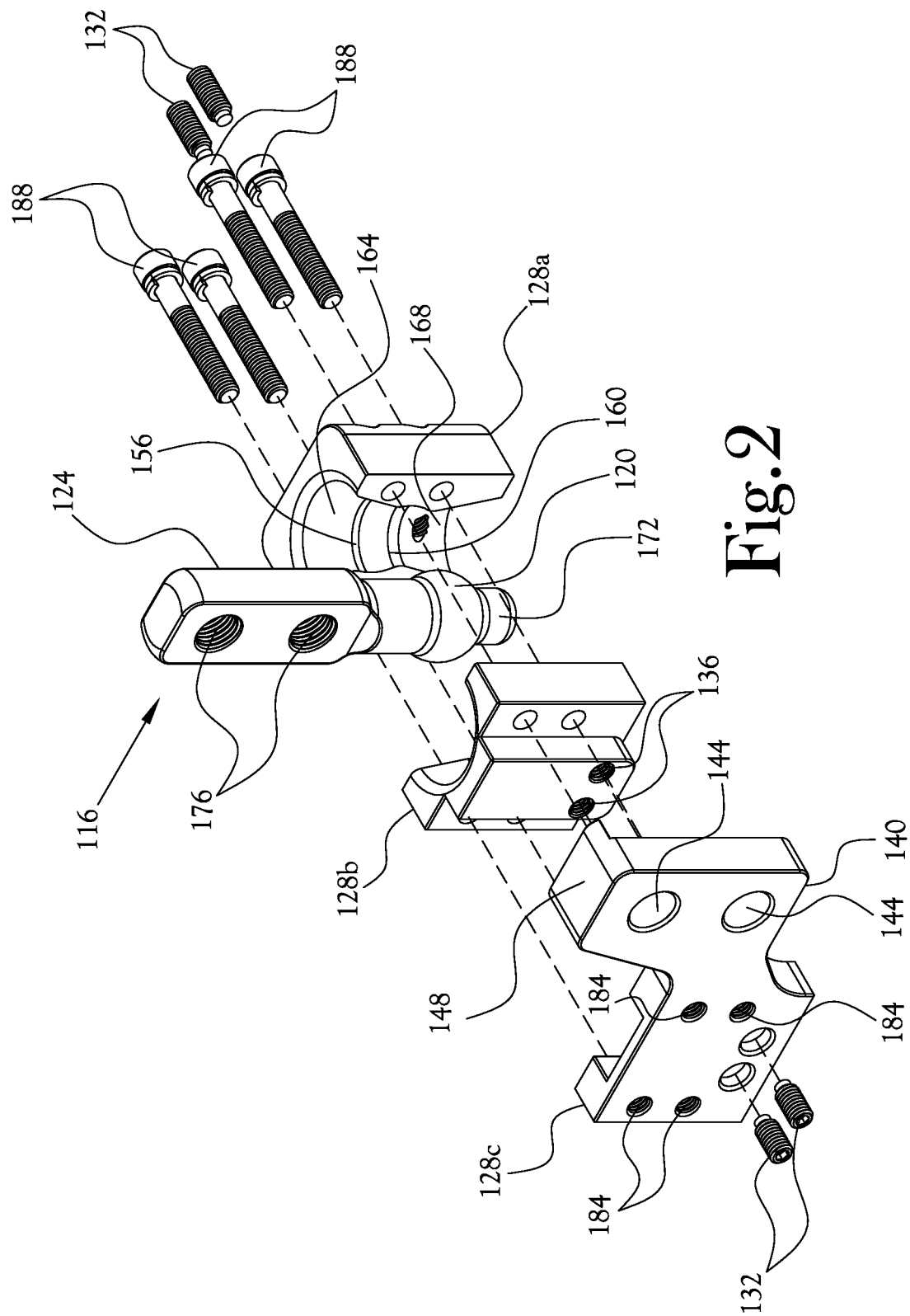
FIG. 2 illustrates an exploded view of the shift lever mount assembly of FIG. 1.

FIG. 2 illustrates an exploded view of the shift lever mount assembly 100 of FIG. 1. As illustrated in FIG. 2, the rotatable member 116 of the shift lever mount assembly 100 includes a ball portion 120 that is formed with at least a partially arcuate surface, and the shift lever connection portion 124 extending up above the ball portion 120 so as to be outside of the casing 128. In this example embodiment, the casing 128 is comprised of three sections including first casing bearing section 128a, second casing bearing section 128b, and casing coupling section 128c. However, it is noted that various example embodiments of the present general inventive concept may have casings with fewer or more sections, in a host of different configurations, without departing from the scope of the present general inventive concept. In the example embodiment illustrated in FIG. 2, a coupling member 140 that is configured to selectively couple the casing to the control lever 108 is shown as being integrally formed with the casing coupling section 128c. In various other example embodiments the coupling member may be formed separately and connected between the casing 128 and the control lever 108. The coupling member 140 includes a plurality of through holes 144 that correspond to through holes 152 formed in the control lever 108 so that the shift lever mount assembly 100 can be connected to the control lever 108 in the same manner as the shift lever 104 may otherwise be connected, i.e., with bolt and nut arrangement or other such securing device through the through holes 144,152. The coupling member 140 also includes an upper flange 148 configured to contact a top of the control lever 108 to provide further structural support, which can increase the convenience for the user when connecting the coupling member 140 to the control lever 108. The coupling member 140 is configured so as to be selectively attachable to either side of the control lever 108, so that the connection of the mount assembly 100 is "reversible." Thus, the coupling member 140 can be attached to a first side of the control lever 108 as shown in FIG. 1, at which orientation the casing 128 and spherical bearing is offset in a forward direction from the control lever 108, and can be attached to a second side of the control lever 108, at which orientation the casing 128 and spherical bearing is offset in a backward direction from the control lever 108.

The inner surface of the casing 128 is provided with a pair of circumferential ribs, including an upper rib 156 and a lower rib 160, provided in parallel and configured to hold the ball portion 120 of the rotatable member 116 captive to form a spherical bearing. With such a spherical bearing, the rotatable member 116 is able to have rotational and angular movement. The inner surface of the casing 128 forms a top opening 164 that tapers outward from the upper rib 156 to allow the shift lever connecting portion 124 of the rotatable member 116 to extend therethrough, and a lower open space 168 that tapers outward from the lower rib 160 to allow movement of a lower nub 172 that extends down below the ball portion 120 of the rotatable member 116. A plurality of threaded bores 136 are formed in the casing 128 to receive a respective plurality of threaded position fixing members 132 which may be threaded to extend into the lower open space 168 to contact the lower nub 172 at multiple points of contact so as to prevent movement of the rotatable member 116, and fix the rotatable member 116 in place at the desired position. Therefore, a user can loosen the position fixing members 132 to position the rotatable member 116, and thus the connected shift lever 104, at the desired position, and then the user can tighten the position fixing members 132 again to contact the lower nub 172 to fix the shift lever 104 in place. In this example embodiment two of the position fixing members 132 pass through the casing coupling section 128c before entering the corresponding threaded bores 136 of the second casing bearing section 128b, but various example embodiments may provide a host of different configurations. In the example embodiment of FIG. 2, the position fixing members 132 are provided such that two of the members 132 pass through two opposite sides of the casing 128, but various example embodiments may provide different configurations, such as, for example, one position fixing member 132 on each side of the casing 128. Also, while the example embodiment illustrated in FIG. 2 includes the position fixing members 132 interacting with the lower nub 172 of the rotatable member 116, in various example embodiments the fixing members 132 may interact with different portions of the rotatable member 116, such as the ball portion 120 or above the ball portion 120. In various example embodiments, the rotation angle of the rotatable member 116 relative to the axis of the upper and lower ribs 156,160, which is considered the axis of the spherical bearing, is controlled by either or both of the physical form of the top opening 164 or lower open space 168. In other words, the angular movement of the rotatable member 116 may be limited by contact between portions of the rotatable member 116 and the sides of the top opening 164 and/or lower open space 168. In various example embodiments the casing 128 is configured such that the rotatable member 116 can be pivoted up to 15 degrees away from the axis of the spherical bearing. Through holes 176 are formed in the shift lever connecting portion 124 to correspond to through holes 180 formed in the lower end of the shift lever 104, so that the shift lever 104 may be attached to the shift lever connecting portion 124 in the same manner that the shift lever 104 may otherwise be connected directly to the control lever 108. Assembly bores 184 are formed though all of the sections 128a,128b,128c of the casing 128 to receive threaded assembly bolts 188 to assemble the casing 128 into a unit. In some example embodiments the assembly bores 184 may be threaded along an entire length of the casing 128, or may only be threaded in certain portions, such as the portions of the assembly bores 184 near the outer edges of the casing 128. Similarly, bores formed in the casing coupling section 128c to pass the position fixing members therethrough may not be threaded in various example embodiments, since the corresponding bores in the casing bearing sections of the casing are threaded.

Figure 3:
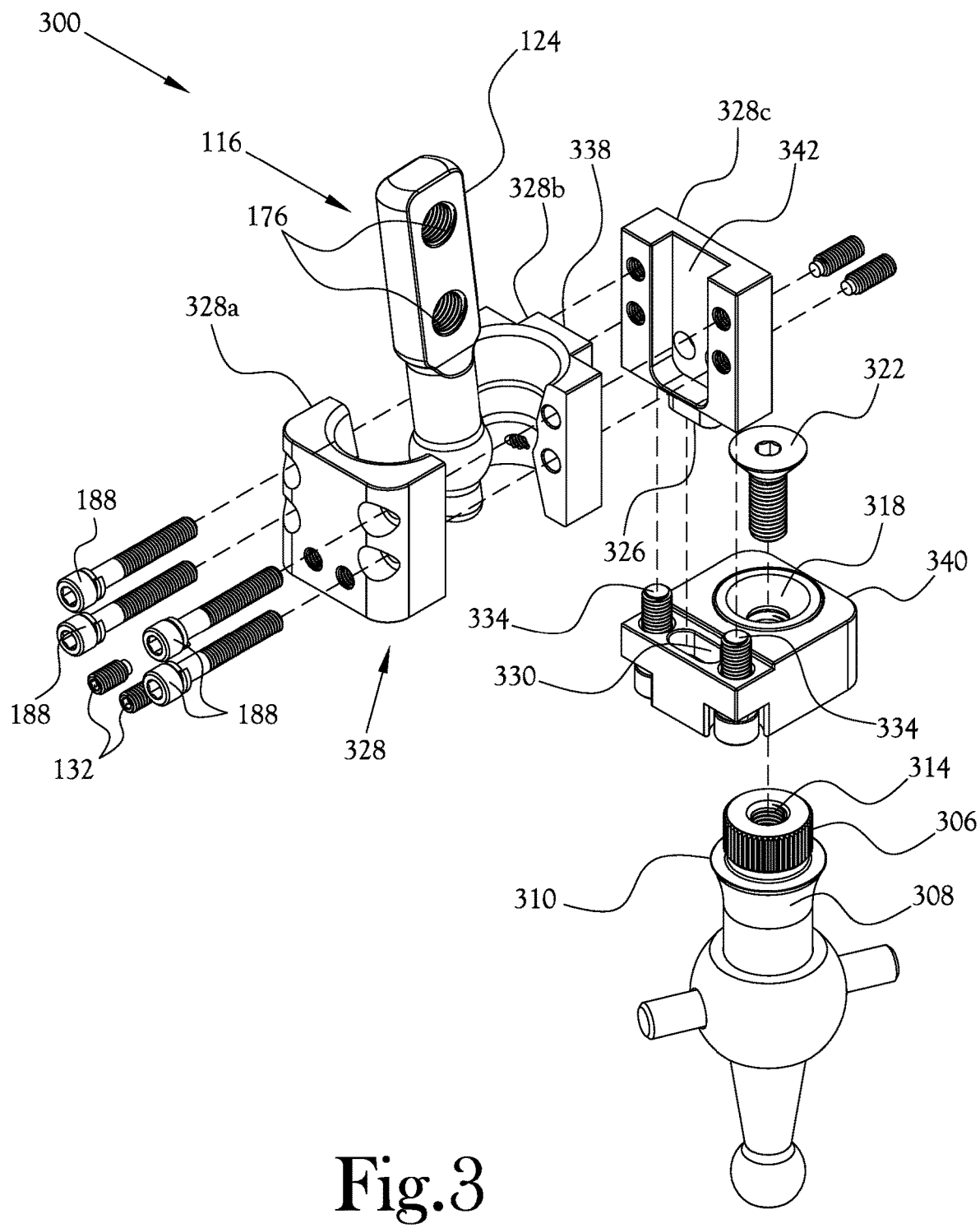
FIG. 3 illustrates an exploded view of a shift lever mount assembly according to another example embodiment of the present general inventive concept.

FIG. 3 illustrates an exploded view of a shift lever mount assembly according to another example embodiment of the present general inventive concept. In the example embodiment illustrated in FIG. 3, the shift lever mount assembly 300 includes a control lever 308, which may be referred to herein as a substitute control lever 308, which is configured to mate with a coupling member 340 of the mount assembly 300 such that the coupling member 340 is mountable on the control lever 308 at a rotational orientation of the user's choosing. In other words, the user can mount the coupling member 340 on the control lever 308 such that a casing 328 is offset in any direction around a longitudinal axis of the control lever. The control lever 308 of this example embodiment is formed with a spline configuration 306 about a top end of the control lever 308, and a bottom surface of the coupling member 340 is formed with a bottom receiving bore having a spline configuration corresponding to the spline configuration 306 of the control lever 308. Thus, due to the male-female mating spline configuration, the coupling member 340 can be rotated to any desired rotational orientation before being mated with the control lever 308, and then simply mated with the control lever 308. In this example embodiment a flange 310 is formed under the spline configuration 306 of the control lever 308 to provide structural support for the coupling member 340. Though the bottom receiving bore is not clearly illustrated in FIG. 3, a similar bore is illustrated in FIG. 5B, which will be described herein. The control lever 308 is formed with a threaded bore 314 that is configured to receive a countersunk screw 322 that passes through a countersunk through hole 318 extending from a top surface of the coupling member 340 down through the bottom receiving bore so as to be axially aligned with the threaded bore 314 of the control lever 340 when the coupling member 340 is mated to the substitute control lever 308 to secure the coupling member 340 thereon.

The casing 328 in the example embodiment of FIG. 3 includes a first casing bearing section 328a, second casing bearing section 328b, and casing coupling section 328c. The casing coupling section 328c is formed to be attached to the coupling member 340. The casing coupling section 328c includes a boss 326 formed on a bottom surface thereof and configured to be received in a detent 330 formed in an upper surface of the coupling member 340. As illustrated in FIG. 3, the detent 330 is formed in a slotted shape, and the boss 326 has a corresponding configuration, such that when the boss 326 is located in the detent 330 any rotational movement of the casing 328 relative to the coupling member 340 is inhibited. In this example embodiment, the face of the second casing bearing section 328b facing the casing coupling section 328c is provided with a male portion 338 configured to fit in a corresponding female portion 342 in the casing coupling section 328c to provide a more secure casing 328 assembly. The casing 328 is further secured to the coupling member 340 by a pair of threaded screws 334 that pass upward from a bottom surface of the coupling member 340 and through to corresponding bores in the bottom surface of the casing coupling section 328c proximate the bore 326. The bores for the corresponding threaded screws 334, the boss 326, and the detent 330 are formed such that the casing 328 may be selectively connected to the coupling member 340 in a reversible fashion. FIGS. 4A-B illustrate perspective views of the shift lever mount assembly of FIG. 3 installed in different orientations. As illustrated in FIG. 4A, the casing 328 is attached to the coupling member 340 such that the casing 328 is offset, and extending away, from the control lever. As illustrated in FIG. 4B, the casing 328 is attached to the coupling member 340 such that the casing 328 is located over the control lever 308. In some example embodiments, when the casing 328 is located over the control lever 308 as shown in FIG. 4B, the spherical bearing may be substantially coaxial with the longitudinal axis of the control lever 308. The shift lever 104 is shown in FIG. 4A simply to aid in understanding of the shift lever mount assembly 300 positioning, and is omitted in FIG. 4B. Thus, due to the splined mating arrangement between the control lever 308 and the coupling member 340, the connecting portion (detent 330, etc.) of the coupling member 340 can be positioned at any point about the longitudinal axis of the control lever 308 when mounting the coupling member 340. Therefore, the user can select to offset the connected casing 328, and therefore the spherical bearing, in any direction about the control lever, or to rotate the casing 328 one hundred and eighty degrees before connection to the coupling member 340 so that the casing 328 is located over the control lever 308. In this example embodiment, the lower surface of the casing coupling section 328c is formed to be lower than the rest of the casing 328 assembly, and a corresponding lowered section in the top surface of the coupling member 340 is configured to receive the lower surface of the casing coupling section 328c. Such a configuration may provide even more structural stability to the fully assembled shift lever mount assembly 300. However, in various other example embodiments the bottom surface of the casing 328 and the top surface of the coupling member 340 may be overall substantially flat, including the area containing the countersunk screw 322.

FIG. 5A illustrates an exploded view of a shift lever mount assembly according to yet another example embodiment of the present general inventive concept. In the example embodiment illustrated in FIG. 5A, the shift lever mount assembly may incorporate the same control lever 308 from FIG. 3, and the casing 528, including first casing bearing section 528a, second casing bearing section 528b, and casing coupling section 528c, is similar to casing 328, except for the lack of a boss on the casing coupling section 528c. The coupling member 540 is formed so that the casing 528 may be placed at a variety of positions offset from the control lever 308, as well as substantially coaxial with the control lever 308. As illustrated in FIG. 5A, the coupling member 540 is provided with a pair of slotted holes 542 formed in parallel along a length of the coupling member 540. The slotted holes 542 are configured to pass threaded screws 334 therethrough, from a bottom surface and through the top surface of the coupling member 540, such that the threaded screws 334 can be received in corresponding threaded bored provided in the bottom of the casing coupling section 528c, to fix the casing 528 onto the coupling member 540 at any point along the length of the slotted holes 542. Thus, when the casing 528 is fixed to the coupling member 540 by the threaded screws 334, a user can simply loosen the threaded screws 334, slide the casing toward or away from the countersunk through hole 318 to a desired position along the length of the slotted holes 542, and then tighten the threaded screws 334 to fix the casing 528 in the new position. Such a configuration provides a large range of positioning possibilities for the casing 528. Also, the reversible configuration accorded by the threaded screws 334 and corresponding threaded bores in the bottom of the casing coupling section 528c allows the user even more positioning range. The coupling member 540 of this example embodiment is attached to the control lever 308 in the same manner as the system 300 of FIG. 3. FIG. 5B illustrates another perspective view of the coupling member 540 of FIG. 5A, so that the splined bottom receiving bore 546 may be more clearly understood. Various example embodiments of the present general inventive concept may provide a host of different mating configurations to attach the coupling member 540 to the control lever 308, which may offer fewer or more positioning possibilities about the longitudinal axis of the control lever 308. Also, as previously noted, the casings described herein may be comprised of fewer or more components, and may be differently configured in the attachment members used to attach the casing to the coupling member 540. In this example embodiment, substantially all of the top surface of the coupling member 540, as well as substantially all of the bottom surface of the casing 528, is flat, and facilitates a slidable positioning of the casing 528 on the coupling member 540 before the fixing thereto.

Figure 6B:
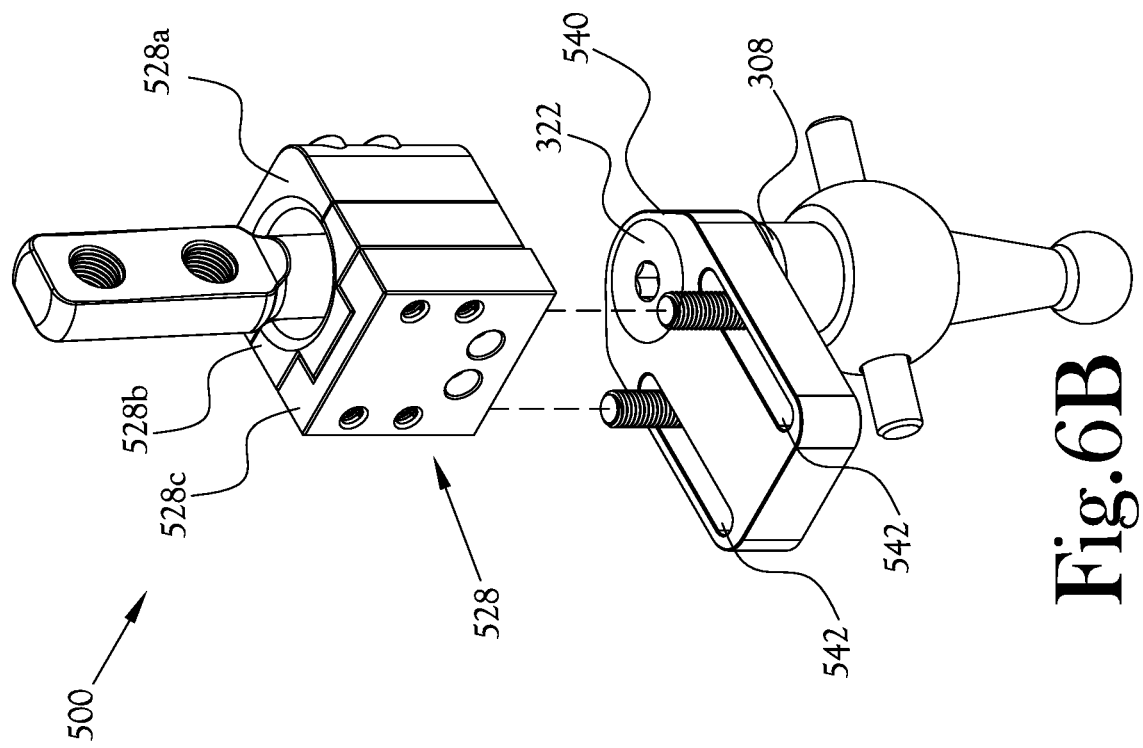
FIGS. 6A-6B illustrate partially exploded views of different positions of the casing on the coupling member in the shift lever mount assembly of FIG. 5A.
Figure 6A:
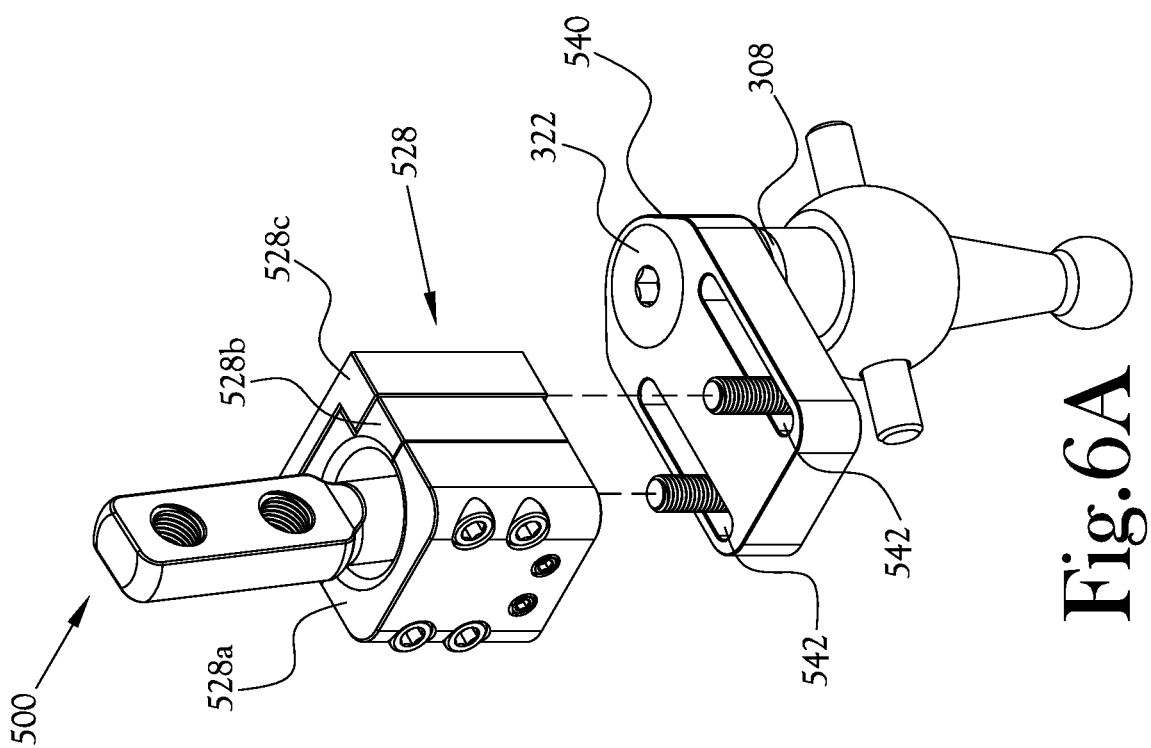

FIGS. 6A-6B illustrate partially exploded views of different positions of the casing on the coupling member in the shift lever mount assembly of FIG. 5A. As illustrated in FIG. 6A, the threaded screws 334 have been positioned proximate the distal ends of the slotted holes 542 of the coupling member 540 to attach the casing 528 at a position at which the spherical bearing is near the maximum offset available from the control lever 308. In FIG. 6B, the threaded screws 334 have been positioned near the proximal ends of the slotted holes 542, and the orientation of the casing 528 has been reversed, i.e., rotated 180 degrees about a point between the threaded screws 334, to be placed nearer the longitudinal axis of the control lever 308. Therefore, it is evident that such a configuration allows multiple positioning possibilities for the casing 528 along the coupling member 540, which allows for more fine tuning of the desired position of the spherical bearing, and therefore the attached shift lever.

In various example embodiments of the present general inventive concept a shift lever may be formed integrally with the rotatable member of the shift lever mount assembly, or may be directly and selectively attachable to the ball portion of the rotatable member. In various example embodiments the spherical bearing may be formed as a ball joint. The amount of possible degrees of angular rotation from the spherical bearing axis may be smaller or larger in various example embodiments without departing from the scope of the present general inventive concept. In various example embodiments the shift lever may be a bolt-on lever, and in other example embodiments the shift lever may attach to the mount assembly through other mechanical configurations. In various example embodiments various quantities of position fixing members may be located on all sides of the casing, or fewer sides, to interact with the rotatable member. In various example embodiments the mount assembly offsets the spherical bearing 1.5 inches from the control lever, and in other example embodiments the offset may be more or less. In various example embodiments a casing may be coupled directly atop the control lever such that the spherical bearing is coaxial with the longitudinal axis of the control lever, and may not be movable to an offset distance from the control lever. In various example embodiments the shift lever attached to the mount assembly can be rotated 360 degrees and tilted 15 degrees in any direction to offer the ideal desired position to a user. In various example embodiments the coupling member may also space the shift lever various distances to either side of the control lever, along with or instead of spacing the shift lever forward or back.

Various example embodiments may provide a shift lever mount assembly including a shift lever mount assembly including a rotatable member including a ball portion formed with at least a partially arcuate surface and a shift lever connection portion extending from the ball portion and configured to be selectively connected to a shift lever, a casing formed to at least partially surround the ball portion of the rotatable member and configured with an inner surface so as to form a spherical bearing with the ball portion, the casing having a top opening configured such that the shift lever connection portion extends therethrough, a plurality of position fixing members provided to the casing and configured to selectively contact the rotatable member so as to fix the rotatable member at a desired position, and a coupling member configured to selectively couple the casing to a control lever of a transmission shift assembly, wherein the spherical bearing is configured to allow rotational and angular movement of the rotatable member so that the rotatable member is selectively movable to the desired position. The spherical bearing may be configured such that the rotatable member can be pivoted up to 15 degrees away from an axis of the spherical bearing. The plurality of fixing members may be configured as threaded members extending through respective through bores formed in the casing so as to selectively contact the rotatable member to prevent movement of the ball member. The rotatable member may further include a lower nub extending from the ball portion in a direction away from the shift lever connection portion, wherein the lower nub is configured to be contacted by the position fixing members to prevent movement of the rotatable member. The interior surface of the casing may be formed with two circumferential ribs, including an upper rib and a lower rib arranged in parallel, configured to hold the ball portion of the rotatable member captive therebetween to form the spherical bearing. The top opening of the casing may taper outward above the upper rib to accommodate movement of the shift lever connection portion, and the casing may include an open space tapering outward below the lower rib to accommodate movement of the lower nub. The coupling member may be configured to extend from an outer surface of the casing and to be selectively coupled to the control lever of the transmission shift assembly such that the spherical bearing is offset from a longitudinal axis of the control lever. The coupling member may be configured to be selectively coupled to the control lever at a first orientation in which the spherical bearing is offset from the longitudinal axis of the control lever in a first direction, or at a second orientation in which the rotational axis is offset from the longitudinal axis of the control lever in a second direction 180 degrees about the longitudinal axis of the control lever from the first direction. The coupling member may be formed integrally with a portion of the casing, and configured to extend from a side of the casing. The shift lever mount assembly may further include a substitute control lever to be used in a transmission shift assembly, and the coupling member may be formed with a bottom receiving bore configured to receive a top end portion of the substitute control lever therein. The bottom receiving bore of the coupling member and the top end portion of the substitute control lever may be configured to form a mating arrangement such that the coupling member is selectively securable to the substitute control lever at a plurality of positions about a longitudinal axis of the substitute control lever. The bottom receiving bore of the coupling member and the top end portion of the substitute control lever may be configured to form a spline fitting. The shift lever mount assembly may further include a countersunk screw configured to secure the coupling member to the substitute control lever, the top end portion of the substitute control lever may be formed with a central threaded bore configured to receive the countersunk screw, and the coupling member may be formed with a countersunk through hole extending from a top surface of the coupling member down through the bottom receiving bore so as to be axially aligned with the central threaded bore when the coupling member is mated to the substitute control lever. The casing may include a boss extending downward from a bottom surface of the casing, and the coupling member may have a detent formed in a top surface of the coupling member and configured to receive the boss of the casing so as to prevent rotational movement of the casing relative to the coupling member. The boss and detent may be formed such that the detent will receive the boss in a first orientation in which the spherical bearing is offset from a longitudinal axis of the substitute control lever, and in a second orientation in which the spherical bearing is substantially coaxial with the longitudinal axis of the substitute control lever. The coupling member may be configured to be connected to the casing by a plurality of threaded connecting members extending through the coupling member into the casing, and the casing may be formed with a plurality of threaded connecting bores configured to receive the threaded connecting members, the threaded connecting bores being configured so as to receive the threaded connecting members in the first orientation and the second orientation. The coupling member may be formed with a plurality of slotted holes formed in parallel along a length of the coupling member and configured to receive threaded connecting members therethrough to connect the casing to the coupling member at a selected one of a variety of locations along the length of the coupling member, and the casing may be formed with a plurality of threaded connecting bores configured to receive the threaded connecting members. The top surface of the coupling member and the bottom surface of the casing may be substantially flat such that the casing is slidable along the top surface of the coupling member when the threaded connecting members are loosened.

Various example embodiments may provide a shift lever mount assembly including a shift lever mount assembly including a rotatable member including a ball portion formed with at least a partially arcuate surface and a shift lever connection portion extending from the ball portion and configured to be selectively connected to a shift lever, a casing formed to at least partially surround the ball portion of the rotatable member and configured with an inner surface so as to form a spherical bearing with the ball portion, the casing having a top opening configured such that the shift lever connection portion extends therethrough, a plurality of threaded position fixing members extending through at least two sides of the casing and configured to selectively contact the rotatable member so as to fix the rotatable member at a desired position, and a coupling member extending from the casing and configured to couple the casing to a control lever of a transmission shift assembly such that the spherical bearing is offset from a longitudinal axis of the control lever, wherein the coupling member is configured to selectively bolt on to opposing sides of the control lever such that the spherical bearing is selectively offset to a front or a back of the control lever, and wherein the spherical bearing is configured to allow rotational and angular movement of the rotatable member so that the rotatable member is selectively movable to the desired position.

Various example embodiments may provide a shift lever mount assembly including a shift lever mount assembly including a rotatable member including a ball portion formed with at least a partially arcuate surface and a shift lever connection portion extending from the ball portion and configured to be selectively connected to a shift lever, a casing formed to at least partially surround the ball portion of the rotatable member and configured with an inner surface so as to form a spherical bearing with the ball portion, the casing having a top opening configured such that the shift lever connection portion extends therethrough, a plurality of threaded position fixing members extending through at least two sides of the casing and configured to selectively contact the rotatable member so as to fix the rotatable member at a desired position, a transmission shift assembly control lever configured with a spline fitting configuration at a top end, and a coupling member configured to couple the casing to a control lever of a transmission shift assembly, wherein a bottom surface of the coupling member is formed with a splined bore configured to receive the top end of control lever such that the coupling member may be fixed at a desired degree of rotation about an entirety of a longitudinal axis of the control lever, wherein the coupling member is configured to be connected to the casing by a plurality of threaded connecting members extending through the coupling member into the casing, wherein the casing is formed with a plurality of threaded connecting bores configured to receive the threaded connecting members such that the casing is selectively oriented in a first orientation in which the spherical bearing is offset from a longitudinal axis of the substitute control lever, or in a second orientation in which the spherical bearing is substantially coaxial with the longitudinal axis of the substitute control lever, and wherein the spherical bearing is configured to allow rotational and angular movement of the rotatable member so that the rotatable member is selectively movable to the desired position.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

It is noted that the simplified diagrams and drawings included in the present application do not illustrate all the various connections and assemblies of the various components, however, those skilled in the art will understand how to implement such connections and assemblies, based on the illustrated components, figures, and descriptions provided herein, using sound engineering judgment. Numerous variations, modifications, and additional embodiments are possible, and, accordingly, all such variations, modifications, and embodiments are to be regarded as being within the spirit and scope of the present general inventive concept.

While the present general inventive concept has been illustrated by description of several example embodiments, and while the illustrative embodiments have been described in detail, it is not the intention of the applicant to restrict or in any way limit the scope of the general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings. Additional modifications will readily appear to those skilled in the art. Accordingly, departures may be made from such details without departing from the spirit or scope of applicant's general inventive concept.

The invention claimed is:

1. A shift lever mount assembly comprising:
a rotatable member comprising:
a ball portion formed with at least a partially arcuate surface;
a shift lever connection portion extending from the ball portion and configured to be selectively connected to a shift lever; and
a lower nub extending from the ball portion in a direction away from the shift lever connection portion;
a casing formed to at least partially surround the ball portion of the rotatable member and configured with an inner surface so as to form a spherical bearing with the ball portion, the casing having a top opening configured such that the shift lever connection portion extends therethrough;
a plurality of position fixing members provided to the casing and configured to selectively contact the rotatable member so as to fix the rotatable member at a desired position; and
a coupling member configured to selectively couple the casing to a control lever of a transmission shift assembly;
wherein the spherical bearing is configured to allow rotational and angular movement of the rotatable member so that the rotatable member is selectively movable to the desired position; and
wherein the lower nub is configured to be contacted by the position fixing members to prevent movement of the rotatable member.

2. The shift lever mount assembly of claim 1, wherein the spherical bearing is configured such that the rotatable member can be pivoted up to 15 degrees away from an axis of the spherical bearing.

3. The shift lever mount assembly of claim 1, wherein the plurality of fixing members are configured as threaded members extending through respective through bores formed in the casing so as to selectively contact the rotatable member to prevent movement of the ball member.

4. The shift lever mount assembly of claim 1, wherein an interior surface of the casing is formed with two circumferential ribs, including an upper rib and a lower rib arranged in parallel, configured to hold the ball portion of the rotatable member captive therebetween to form the spherical bearing.

5. The shift lever mount assembly of claim 4, wherein the top opening of the casing tapers outward above the upper rib to accommodate movement of the shift lever connection portion; and
wherein the casing comprises an open space tapering outward below the lower rib to accommodate movement of the lower nub.

6. The shift lever mount assembly of claim 1, wherein the coupling member is configured to extend from an outer surface of the casing and to be selectively coupled to the control lever of the transmission shift assembly such that the spherical bearing is offset from a longitudinal axis of the control lever.

7. The shift lever mount assembly of claim 6, wherein the coupling member is configured to be selectively coupled to the control lever at a first orientation in which the spherical bearing is offset from the longitudinal axis of the control lever in a first direction, or at a second orientation in which the rotational axis is offset from the longitudinal axis of the control lever in a second direction 180 degrees about the longitudinal axis of the control lever from the first direction.

8. The shift lever mount assembly of claim 6, wherein the coupling member is formed integrally with a portion of the casing, and configured to extend from a side of the casing.

9. The shift lever mount assembly of claim 1, further comprising:

a substitute control lever to be used in a transmission shift assembly;

wherein the coupling member is formed with a bottom receiving bore configured to receive a top end portion of the substitute control lever therein.

10. The shift lever mount assembly of claim 9, wherein the bottom receiving bore of the coupling member and the top end portion of the substitute control lever are configured to form a mating arrangement such that the coupling member is selectively securable to the substitute control lever at a plurality of positions about a longitudinal axis of the substitute control lever.

11. The shift lever mount assembly of claim 10, wherein the bottom receiving bore of the coupling member and the top end portion of the substitute control lever are configured to form a spline fitting.

12. The shift lever mount assembly of claim 9, further comprising a countersunk screw configured to secure the coupling member to the substitute control lever;

wherein the top end portion of the substitute control lever is formed with a central threaded bore configured to receive the countersunk screw; and wherein the coupling member is formed with a countersunk through hole extending from a top surface of the coupling member down through the bottom receiving bore so as to be axially aligned with the central threaded bore when the coupling member is mated to the substitute control lever.

13. The shift lever mount assembly of claim 9, wherein the casing comprises a boss extending downward from a bottom surface of the casing, and wherein the coupling member has a detent formed in a top surface of the coupling member and configured to receive the boss of the casing so as to prevent rotational movement of the casing relative to the coupling member.

14. The shift lever mount assembly of claim 13, wherein the boss and detent are formed such that the detent will receive the boss in a first orientation in which the spherical bearing is offset from a longitudinal axis of the substitute control lever, and in a second orientation in which the spherical bearing is substantially coaxial with the longitudinal axis of the substitute control lever.

15. The shift lever mount assembly of claim 14, wherein the coupling member is configured to be connected to the casing by a plurality of threaded connecting members extending through the coupling member into the casing; and wherein the casing is formed with a plurality of threaded connecting bores configured to receive the threaded connecting members, the threaded connecting bores being configured so as to receive the threaded connecting members in the first orientation and the second orientation.

16. The shift lever mount assembly of claim 9, wherein the coupling member is formed with a plurality of slotted holes formed in parallel along a length of the coupling member and configured to receive threaded connecting members therethrough to connect the casing to the coupling member at a selected one of a variety of locations along the length of the coupling member; and wherein the casing is formed with a plurality of threaded connecting bores configured to receive the threaded connecting members.

17. The shift lever mount assembly of claim 16, wherein a top surface of the coupling member and a bottom surface of the casing are substantially flat such that the casing is slidable along the top surface of the coupling member when the threaded connecting members are loosened.

18. A shift lever mount assembly comprising:

a rotatable member comprising:

a ball portion formed with at least a partially arcuate surface;

a shift lever connection portion extending from the ball portion and configured to be selectively connected to a shift lever; and a lower nub extending from the ball portion in a direction away from the shift lever connection portion;

a casing formed to at least partially surround the ball portion of the rotatable member and configured with an inner surface so as to form a spherical bearing with the ball portion, the casing having a top opening configured such that the shift lever connection portion extends therethrough;

a plurality of threaded position fixing members extending through at least two sides of the casing and configured to selectively contact the rotatable member so as to fix the rotatable member at a desired position; and a coupling member extending from the casing and configured to couple the casing to a control lever of a transmission shift assembly such that the spherical bearing is offset from a longitudinal axis of the control lever;

wherein the coupling member is configured to selectively bolt on to opposing sides of the control lever such that the spherical bearing is selectively offset to a front or a back of the control lever;

wherein the lower nub is configured to be contacted by the position fixing members to prevent movement of the rotatable member; and wherein the spherical bearing is configured to allow rotational and angular movement of the rotatable member so that the rotatable member is selectively movable to the desired position.

* * * * *